(12) United States Patent
Gilstad et al.

(10) Patent No.: US 8,276,918 B1
(45) Date of Patent: *Oct. 2, 2012

(54) PLUNGER SEAL RING

(76) Inventors: Barbara C. Gilstad, San Antonio, TX (US); Dennis W. Gilstad, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,235

(22) Filed: Apr. 26, 2012

Related U.S. Application Data

(63) Continuation-in-part of application No. 13/184,965, filed on Jul. 18, 2011, now Pat. No. 8,210,542.

(51) Int. Cl.
*F16J 15/00* (2006.01)
*F16J 15/26* (2006.01)

(52) U.S. Cl. ........ 277/530; 277/553; 277/567; 277/605; 277/645; 277/647

(58) Field of Classification Search .................. 277/530, 277/553, 567, 605, 644–645, 647
See application file for complete search history.

(56) References Cited

U.S. PATENT DOCUMENTS

| | | | |
|---|---|---|---|
| 3,617,589 A | 11/1971 | Jones-Hinton et al. | |
| 3,951,849 A | 4/1976 | Vickery et al. | |
| 4,300,775 A * | 11/1981 | Ringel | 277/589 |
| 4,572,519 A | 2/1986 | Cameron et al. | |
| 4,759,428 A | 7/1988 | Seshimo | |
| 4,852,533 A | 8/1989 | Doncker et al. | |
| 5,183,863 A * | 2/1993 | Nakamura et al. | 525/438 |
| 5,580,068 A * | 12/1996 | Gundy | 277/605 |
| 5,639,098 A | 6/1997 | MacDonald | |
| 6,432,320 B1 * | 8/2002 | Bonsignore et al. | 252/70 |
| 6,701,529 B1 | 3/2004 | Rhoades et al. | |
| 7,608,314 B2 | 10/2009 | Plant | |
| 7,847,057 B2 | 12/2010 | Muller et al. | |
| 7,942,603 B2 | 5/2011 | Miller | |
| 2005/0244644 A1 * | 11/2005 | Hampden-Smith et al. | 428/408 |

* cited by examiner

*Primary Examiner* — Vishal Patel
(74) *Attorney, Agent, or Firm* — Dennis W. Gilstad

(57) ABSTRACT

One or more multifunction elastomeric plunger seal rings augment a plunger packing assembly within a plunger pump packing box. Each such ring comprises a totally-enclosed circumferential tubular cavity. The cavity is filled with a dilatant liquid which transmits hydraulic pressure throughout the tubular cavity and simultaneously damps pump vibration transmitted via the packing box. Pump pressure strokes increase tubular cavity hydraulic pressure, resulting in radial ring expansion forces both inwardly toward a plunger and outwardly toward its packing box. Inward ring expansion tends to close the extrusion gap, while outward expansion force improves heat transfer from plunger to packing box. Outward expansion force also increases coupling of packing box vibration to hysteresis loss in the dilatant liquid. During reductions in both pumped fluid pressure and associated pump vibration between pressure strokes, sealing and vibration damping functions of the rings are attenuated, reducing heat generation and frictional ring wear.

20 Claims, 3 Drawing Sheets

PLUNGER SEAL RING

This application is a continuation-in-part of copending application Ser. No. 13/184,965, filed 18 Jul. 2011, which is incorporated by reference.

FIELD OF THE INVENTION

The invention relates generally to high-pressure plunger pumps, and more specifically to the plunger packing assemblies installed to reduce leakage around the plunger(s) of such pumps.

BACKGROUND

High-pressure plunger pumps used in oil and gas fields, particularly those intended for fracking, are usually designed in two sections. The (proximal) power section (herein "power end") and the (distal) fluid section (herein "fluid end") are often truck-mounted for easy relocation from well-to-well. The fluid end comprises a housing incorporating one or more functional units, each functional unit typically comprising a suction valve, a discharge valve, and a plunger bore in which a reciprocating plunger alternately produces suction strokes and pressure strokes. Each functional unit also incorporates a packing box containing plunger packing assemblies analogous to packing assemblies shown in U.S. Pat. No. 4,572,519, incorporated by reference. Adjacent packing rings, as shown in the '519 patent, have corresponding chevron-shaped ends which reduce leakage as the rings are longitudinally compressed between a proximal bronze adapter ring and a distal adapter ring.

Packing rings thus longitudinally compressed can seal tightly around a plunger, ideally preventing leaks even at peak pumped-fluid pressures of about 15,000 psi. Because of the high peak operating pressures common in modern practice, packing rings must be made relatively stiff. They may comprise, for example, layered fabric-reinforced rubber. Each chevron-shaped ring end then comprises a concave or convex circumferential feature which is an extension of the ring's layered construction. Corresponding chevron shapes on adjacent packing ring ends allow for modest radial expansion under longitudinal compression to achieve a tight seal around a plunger. Longitudinal compression force, in turn, is provided by a gland nut and by the cyclically increased pressure of the pumped fluid.

Turning the gland nut adjusts longitudinal preload (i.e., baseline longitudinal compressive force) that is applied to the packing ring(s). Such preload is intended to prevent leakage and/or excessive cyclic ring movement under peak pumped-fluid pressures, with their associated pump vibrations. The emergence of pump vibration as a potential service-life issue in high-pressure plunger pumps has focused attention on how vibration affects, among other things, plunger seals' tendency to leak. See, e.g., U.S. Pat. No. 5,639,098, incorporated by reference.

To minimize seal leakage, substantial longitudinal preload is applied to packing rings which have been manufactured to fit very tightly around a plunger even before preload is applied. Thus, even if longitudinal preload is reduced to zero by backing out the gland nut completely, packing rings typically remain tightly sealed around the plunger due to their stiffness. This means the plunger must virtually always be withdrawn from the packing box to allow removal of the packing ring(s), as may be required during pump maintenance. Plunger withdrawal, however, is often complex because of interference between the plunger and various power end components.

Complex pump maintenance is required more frequently in modern practice because the packing rings' high-pressure sealing function requires that the rings substantially retain their original (chevron) end shape. But such ring-shape retention becomes progressively more difficult as frictional heat developed during pump operation softens the packing rings and predisposes them to extrusion under pressure through a gap (the extrusion gap) between the proximal adapter ring and the plunger.

A conflict thus arises when packing ring longitudinal compression is increased to improve the plunger seal, because that increased compression also results in additional frictional heating which degrades the rings' functional integrity. Since dissipating heat within the confines of the packing box is difficult, high pressure plunger pumps are often limited to relatively short periods of operation (e.g., no more than a few hours). Extrusion of the packing ring material through the extrusion gap is thereby limited. But if pump run times are extended, packing rings tend to overheat and fail prematurely.

The above conflict has been partially resolved by replacing the proximal bronze adapter ring with a proximal adapter ring comprising PEEK polymer in certain seals. PEEK (polyetheretherketone) is a high performance thermoplastic, a portion of which moves radially inward under longitudinal compression, tending to narrow the extrusion gap. Such radial inward (gap-narrowing) movement is termed "elongation" in industry advertising and is said to be more prominent in a PEEK adapter ring than in an analogous bronze adapter ring. See, e.g., U.S. Pat. No. 7,847,057 B2, incorporated by reference. While the use of commercially-available PEEK adapter rings appears to increase plunger packing service life, issues related to frictional wear, heat generation and pump vibration remain.

SUMMARY OF THE INVENTION

To address plunger packing service life issues, one or more multifunction elastomeric plunger seal rings are inserted to augment a plunger packing assembly within a plunger pump packing box. Each such ring comprises a totally-enclosed circumferential tubular cavity. The cavity is filled with a shear-thickening liquid (i.e., a dilatant liquid) which transmits hydraulic pressure throughout the tubular cavity and simultaneously damps pump vibration transmitted from the pump housing via the packing box. Pump pressure strokes increase tubular cavity hydraulic pressure, resulting in radial expansion forces within a multifunction ring directed both inwardly (toward a plunger) and outwardly (toward its packing box). Inward ring expansion tends to close the extrusion gap, thus reducing packing ring wear. Outward expansion force, on the other hand, improves contact with the packing box, thus facilitating heat transfer from plunger to packing box via the dilatant liquid. Outward expansion force also increases coupling of packing box vibration to controlled hysteresis loss (i.e., heat loss) within the shear-thickening liquid of the tubular cavity. See, e.g., U.S. Pat. No. 6,701,529 B1, incorporated by reference. During reductions in pumped-fluid pressure (and corresponding reductions in the associated pump vibration) between pressure strokes, sealing and vibration damping functions of the rings are attenuated, thereby reducing heat generation and frictional ring wear.

Vibration damping functions of multifunction plunger seal rings may be selectively altered (i.e., "tuned") as described herein to beneficially reduce pump vibration during both peak and off-peak portions of the pumped-fluid pressure cycle. See, e.g., the '529 patent cited above. Such tuning is, in part, a function of the particular vibration source frequencies. For example, relatively low frequencies may emanate from power end gear trains, while broad spectrum vibration from suction valve closing energy impulses may excite one or more higher-frequency pump housing vibration resonances. The invention, however, allows controlled-damping parameters associated with multifunction plunger seal rings to be predetermined so as to correspond to such resonances, as well as to analogous damping functions elsewhere in a pump (e.g., in a suction valve itself). Further, controlled-damping parameters may be optimized for avoiding an excessive increase of one or more resonant vibration amplitudes during pump operation. See, e.g., copending application Ser. No. 13/444, 876, incorporated by reference.

Note that plungers may weigh several dozen to several hundred pounds, and each is supported within its pump housing solely by the packing rings and one or more multifunction rings. To the extent that the combination of supporting rings provides a viscoelastic coupling of plunger to housing, the plunger can function as the driven mass in a viscoelastic damper. See, e.g., U.S. Pat. No. 4,759,428, incorporated by reference. Through careful attention to ring design, the plunger and its supporting rings may be configured to function together as a viscoelastic damper for significantly reducing potentially damaging pump vibration overall, a beneficial function not previously associated with plungers.

To assist understanding of the invention, first, second and third embodiments are discussed herein only as illustrative examples. In a first invention embodiment, a circular elastomeric multifunction ring symmetrical about a longitudinal axis has a cylindrical inner surface, a cylindrical outer surface, and a totally-enclosed circumferential tubular cavity. The tubular cavity is filled with a dilatant liquid for transferring heat, for damping vibration, and for transmitting hydraulic pressure throughout the tubular cavity. Dilatancy is a property found in liquids in which additives are suspended (e.g., copolymers and/or minute particles having special properties). See, e.g., U.S. Pat. No. 7,608,314 B2, incorporated by reference, plus the '428 patent cited above. A dilatant material is typically a material in which the viscosity increases with the rate of shear. See, e.g., U.S. Pat. No. 7,942,603 B2, incorporated by reference. An example of a dilatant liquid comprises colloidal silica dispersed in a fluid such as polyethylene glycol. See, e.g., the '603 patent.

An elastomeric multifunction ring of the invention may comprise at least one thermoplastic polymer. The tubular cavity is spaced equidistant from the inner surface and the outer surface (or is otherwise centrally-located), and at least the first ring end may comprise a chevron-shaped circumferential feature. Due to the enhanced radial-expansion responsiveness of a multifunction ring to longitudinal force, either or both chevron-shaped ends may not be required in all embodiments. Equidistant spacing of the tubular cavity from the inner surface and the outer surface (or analogous central location of the cavity) ensures that longitudinal compression of a circular elastomeric multifunction ring results in substantially uniform symmetrical (longitudinal) shortening of the ring. This maintains the functional symmetric shape of a plunger packing assembly comprising one or more multifunction rings.

The first embodiment's dilatant liquid may comprise mineral oil (see, e.g., U.S. Pat. No. 3,951,849, incorporated by reference), which may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., U.S. Pat. No. 6,432,320 B1, incorporated by reference. The thermoplastic polymer may comprise polyaryletherketone (PAEK), for example, polyetheretherketone (PEEK). See, e.g., the '057 patent cited above.

In a second invention embodiment a circular elastomeric multifunction ring symmetrical about a longitudinal axis has a cylindrical inner surface, a cylindrical outer surface, and a totally-enclosed centrally-located circumferential tubular cavity, the tubular cavity being filled with a dilatant liquid for transferring heat, for damping vibration, and for transmitting hydraulic pressure throughout said tubular cavity. The dilatant liquid comprises at least one particulate filler. See, e.g., the '314 patent cited above, plus the '603 and '529 patents cited above.

In a third invention embodiment of the invention a circular elastomeric multifunction ring symmetrical about a longitudinal axis has a cylindrical inner surface, a cylindrical outer surface, and a totally-enclosed centrally-located circumferential tubular cavity, the tubular cavity being filled with a dilatant liquid for transferring heat, for damping vibration, for transmitting hydraulic pressure throughout said tubular cavity, and for avoiding an excessive increase of at least one resonant vibration amplitude. See, e.g., U.S. Pat. No. 4,852,533.

Note that the invention includes a plunger packing assembly comprising at least one circular elastomeric multifunction ring, as well as a plunger pump which comprises at least one such plunger packing assembly.

Longitudinal pressurization of a plunger packing assembly is generally a combination of static and dynamic forces. Static pressurization can result from tightening a packing gland nut, while dynamic pressurization can result from pressurized pumped fluid (e.g., during periodic pump pressure strokes). Either static or dynamic pressurization of plunger packing tends to cause longitudinal compression of the elastomeric multifunction ring(s) present in the plunger packing assembly. The result is uniformly symmetrical radial expansion of the elastomeric multifunction ring against both a plunger and its packing box. Longitudinal compressive force thus applied to an elastomeric multifunction ring is mediated via the compliance of any chevron-shaped packing ring(s) lying between the elastomeric multifunction ring and the pumped fluid. The dynamic response of a plunger packing assembly as a whole may be altered by changing the dynamic compliance of the chevron-shaped packing rings and/or one or more multifunction rings as described herein. See, e.g., the '533 patent cited above.

DETAILED DESCRIPTION

Figure 1:
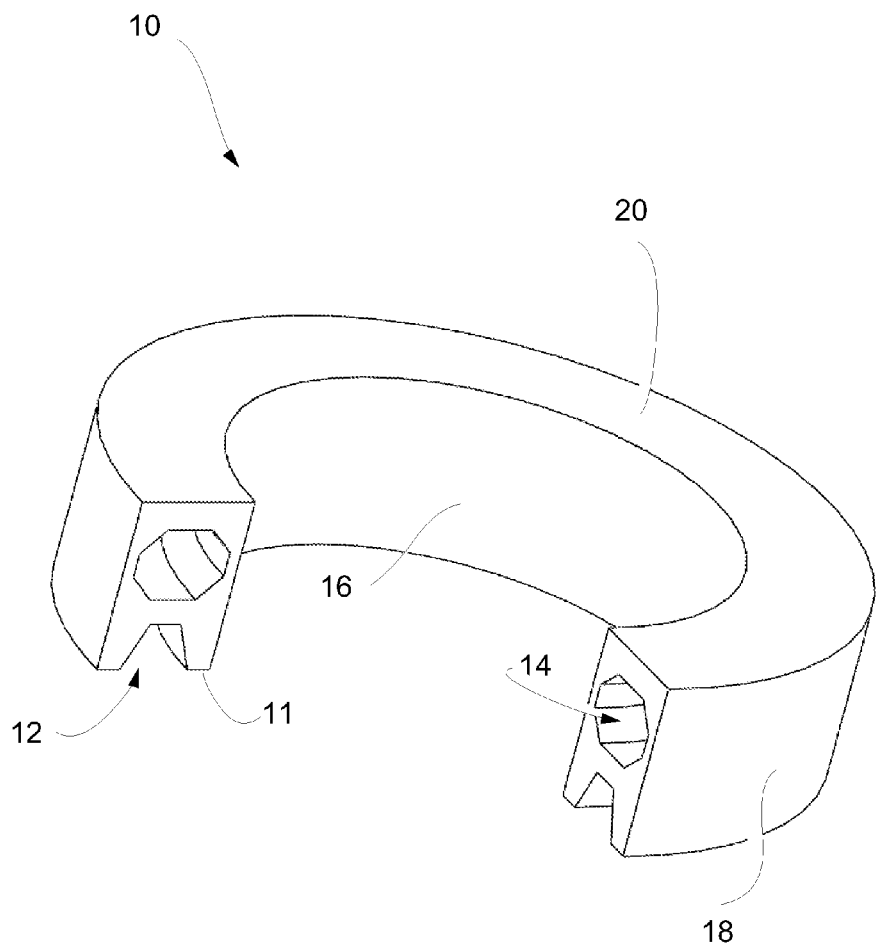
FIG. 1 is a 3-dimensional partial cross-sectional view of a multifunction plunger seal ring schematically illustrating a plane end, a circumferential tubular cavity, and an end having a chevron-shaped (concave) circumferential feature.
Figure 2:
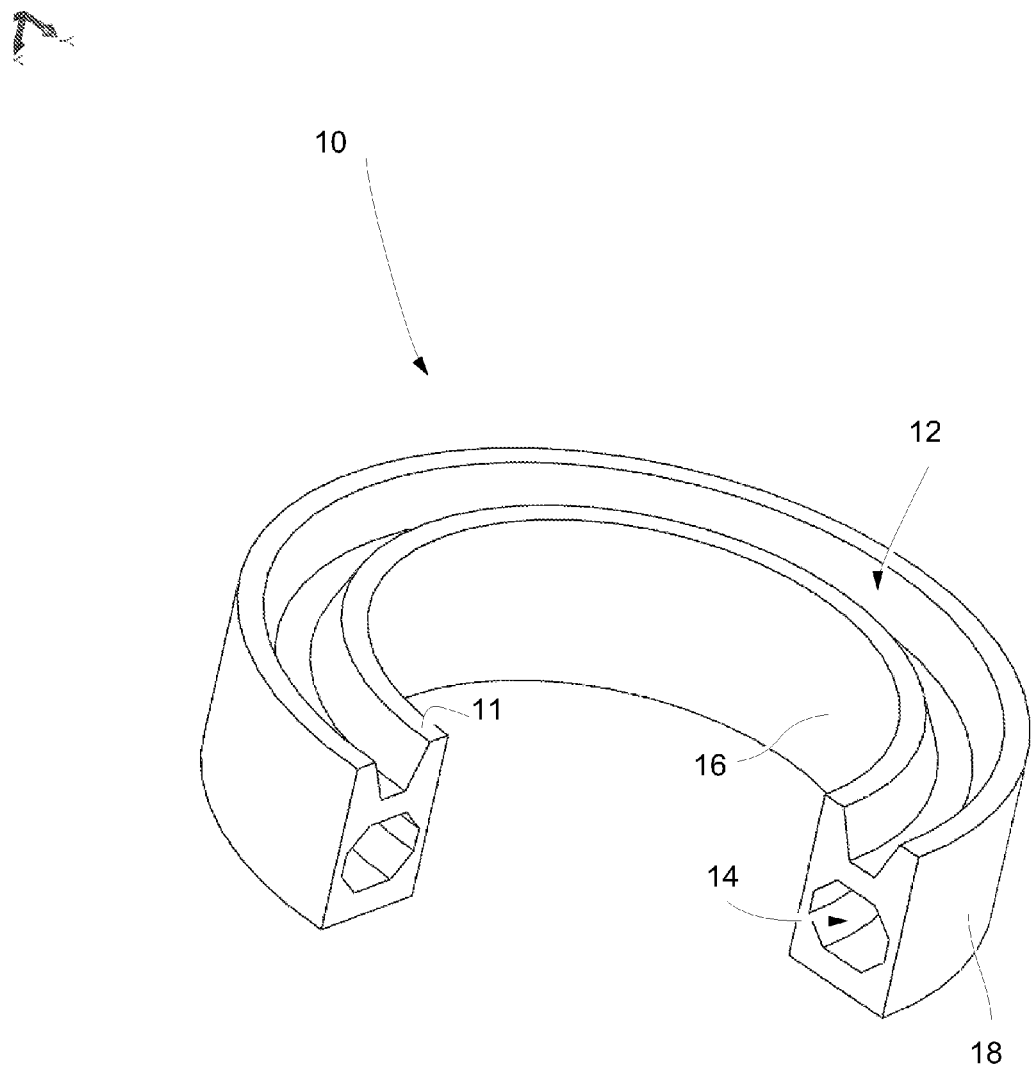
FIG. 2 is an inverted 3-dimensional partial cross-sectional view of the plunger seal ring schematically illustrated in FIG. 1, the view showing the chevron-shaped (concave) circumferential feature more completely.
Figure 3:
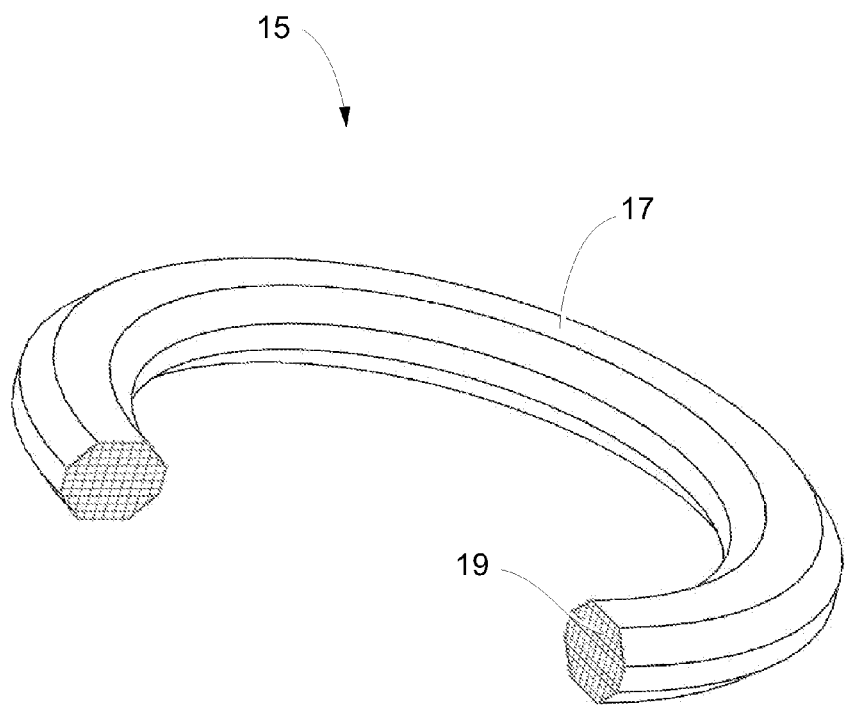
FIG. 3 is an instantaneous 3-dimensional partial cross-sectional view of a dilatant liquid comprising additives, the view schematically illustrating that the shape of the dilatant liquid within the circumferential tubular cavity of FIG. 1 or FIG. 2 closely reflects the shape of the circumferential tubular cavity of FIG. 1 or FIG. 2.
Figure 3:

FIGS. 1 and 2 show different schematic views of a circular elastomeric multifunction ring 10 of the invention, which is further described below. FIG. 3 refers to a schematic representation of the instantaneous shape of dilatant liquid 17 as it lies within circumferential tubular cavity 14 of ring 10. Note that the instantaneous spatial configuration 15 of dilatant liquid 17 as shown in FIG. 3 conforms closely to the interior of tubular cavity 14 as shown schematically in FIGS. 1 and 2. Such close conformation ensures that dilatant liquid 17 will uniformly transmit hydraulic pressure arising in any portion of tubular cavity 14 (as, for example, resulting from longitudinal compression of ring 10).

In the invention embodiment schematically illustrated herein, a circular elastomeric multifunction ring 10 symmetrical about a longitudinal axis has a first end 11, a second end 20, a cylindrical inner surface 16, a cylindrical outer surface 18, and a totally-enclosed circumferential tubular cavity 14. Tubular cavity 14 contains a dilatant liquid 17 for transferring heat, for damping vibration, for transmitting hydraulic pressure throughout tubular cavity 14, and/or for avoiding excessive increase of at least one resonant vibration amplitude. Ring 10 in the illustrated embodiment comprises at least one thermoplastic polymer, and tubular cavity 14 is spaced equidistant from inner surface 16 and outer surface 18. Further, first end 11 comprises a chevron-shaped (concave) circumferential feature 12.

The illustrated embodiment's dilatant liquid 17 may comprise mineral oil and additives 19. Additives 19, in turn, may include metallic nanoparticles and/or other fillers (particulate and/or fibrous) Additives 19 may be invisible to the naked eye as they may include colloidal particles. Hence, additives 19 are schematically illustrated by the indicated cross-sectional pattern labeled 19 in FIG. 3. Additives 19 may comprise, for example, copper, beryllium, titanium, nickel, iron, alloys or blends thereof, and carbon. The term nanoparticle may conveniently be defined as including particles having an average size of up to about 2000 nm. The thermoplastic polymer of ring 10 may comprise polyaryletherketone (PAEK), for example, polyetheretherketone (PEEK).

In alternative invention embodiments dilatant liquid 17 may comprise lubricants such as silicone oils, fatty acids, fatty acid salts, and greases. Solid particulate or fibrous fillers such as silica, or microspheres of silica, phenolic resins, or thermoplastics may also be used. See the '529 patent cited above.

In addition to the illustrated embodiment, still other alternative invention embodiments exist. For example, a plunger packing assembly may comprise a plurality of elastomeric multifunction rings of the invention interspersed with (for example, arranged alternately with) rubberized fabric or analogous chevron-shaped plunger packing rings. Note that chevron-shaped plunger packing rings as described herein are packing rings having at least one end (and frequently both ends) comprising a substantially convex circumferential feature or a substantially concave circumferential feature.

Such interspersed plunger packing assembly embodiments thus have a plurality of extrusion gaps (i.e., one extrusion gap associated with each elastomeric multifunction ring of the invention) when installed over a plunger in a pump. During a pump pressure stroke, the pumped fluid pressure will then be distributed over the longitudinal dimension of the plunger packing assembly, with partial pressure differentials associated with each extrusion gap and the adjacent rubberized fabric or analogous chevron-shaped packing ring(s). While the total of the instantaneous partial pressure differentials at a given time approximates the total instantaneous pressure of the pumped fluid at that given time, the instantaneous partial pressure differential associated with each extrusion gap will only be a fraction of the total pumped fluid pressure. Thus, the amounts of seal extrusion as well as frictional heating and wear associated with each such extrusion gap within the plunger packing assembly are reduced. Since both heat generation and heat scavenging are distributed over a longitudinal dimension of such a plunger packing assembly as a whole, maximum temperatures experienced by the plunger packing assembly (and corresponding temperature-related damage) are reduced.

Note that an elastomeric plunger packing ring of the invention may be molded in corresponding mating portions which are then laser welded together using techniques well known to those skilled in the art. The mating portions are chosen to reflect the disclosure herein. See, e.g., the '057 patent cited above and U.S. Pat. No. 3,617,589, incorporated by reference. Following the welding step, one or more holes may be drilled to access the interior tubular cavity, with subsequent filling of the tubular cavity with dilatant liquid and, if desired, nanoparticles. Subsequent welding closure of the drilled access holes will yield a circular elastomeric multifunction ring substantially as described herein.

Note also that the dilatant liquid within a circular elastomeric multifunction ring of the invention may be maintained (e.g., by temperature control) in a sufficiently solid state during ring fabrication to permit use of rapid-prototyping (i.e., layer-wise) techniques. Such techniques may obviate the fluid-filling step above. See, e.g., the '057 and '589 patents cited above.

What is claimed is:

1. A circular elastomeric multifunction ring symmetrical about a longitudinal axis and having an inner surface, an outer surface, first and second ends, and a totally-enclosed circumferential tubular cavity, said tubular cavity being filled with a dilatant liquid for transferring heat, for damping vibration, and for transmitting hydraulic pressure throughout said tubular cavity;
   wherein said elastomeric multifunction ring comprises at least one thermoplastic polymer;
   wherein at least said first end comprises a chevron-shaped circumferential feature; and
   wherein said tubular cavity is spaced equidistant from said inner surface and said outer surface.

2. The multifunction ring of claim 1 wherein said dilatant liquid comprises mineral oil.

3. The multifunction ring of claim 2 wherein said dilatant liquid additionally comprises nanoparticles.

4. The multifunction ring of claim 3 wherein said nanoparticles comprise metallic nanoparticles having an average size of up to about 2000 nm.

5. The multifunction ring of claim 1 comprising polyaryletherketone.

6. A plunger packing assembly comprising at least one multifunction ring of claim 1.

7. A pump comprising at least one plunger packing assembly of claim 6.

8. A circular elastomeric multifunction ring symmetrical about a longitudinal axis and having an inner surface, an outer surface, first and second ends, and a totally-enclosed centrally-located circumferential tubular cavity, said tubular cavity being filled with a dilatant liquid for transferring heat, for damping vibration, and for transmitting hydraulic pressure throughout said tubular cavity;
- wherein said elastomeric multifunction ring comprises at least one thermoplastic polymer;
- wherein said tubular cavity is spaced equidistant from said inner surface and said outer surface;
- wherein at least said first end comprises a chevron-shaped circumferential feature; and
- wherein said dilatant liquid comprises at least one particulate filler.

9. The multifunction ring of claim 8 wherein said dilatant liquid comprises mineral oil.

10. The multifunction ring of claim 9 wherein said dilatant liquid additionally comprises nanoparticles.

11. The multifunction ring of claim 10 wherein said nanoparticles comprise metallic nanoparticles having an average size of up to about 2000 nm.

12. The multifunction ring of claim 8 comprising polyaryletherketone.

13. A plunger packing assembly comprising at least one multifunction ring of claim 8.

14. A pump comprising at least one plunger packing assembly of claim 13.

15. A circular elastomeric multifunction ring symmetrical about a longitudinal axis and having an inner surface, an outer surface, first and second ends, and a totally-enclosed centrally-located circumferential tubular cavity, said tubular cavity being filled with a dilatant liquid for transferring heat, for damping vibration, for transmitting hydraulic pressure throughout said tubular cavity, and for avoiding an excessive increase of at least one resonant vibration amplitude;
- wherein said elastomeric multifunction ring comprises at least one thermoplastic polymer;
- wherein said tubular cavity is spaced equidistant from said inner surface and said outer surface; and
- wherein at least said first end comprises a chevron-shaped circumferential feature.

16. The multifunction ring of claim 15 wherein said dilatant liquid comprises at least one fibrous filler.

17. The multifunction ring of claim 15 wherein said dilatant liquid comprises at least one particulate filler.

18. The multifunction ring of claim 15 wherein said dilatant liquid comprises metallic nanoparticles.

19. A plunger packing assembly comprising at least one multifunction ring of claim 15.

20. A pump comprising at least one plunger packing assembly of claim 19.

\* \* \* \* \*